US 7,986,375 B2

(12) United States Patent
Krijn et al.

(10) Patent No.: US 7,986,375 B2
(45) Date of Patent: Jul. 26, 2011

(54) MULTI-VIEW AUTOSTEREOSCOPIC DISPLAY DEVICE HAVING PARTICULAR DRIVING MEANS AND DRIVING METHOD

(75) Inventors: Marcellinus Petrus Carolus Michael Krijn, Eindhoven (NL); Oscar Hendrikus Willemsen, Eindhoven (NL); Siebe Tjerk De Zwart, Eindhoven (NL); Ivar Jacco Boerefijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 333 days.

(21) Appl. No.: 12/377,680

(22) PCT Filed: Aug. 14, 2007

(86) PCT No.: PCT/IB2007/053219
§ 371 (c)(1),
(2), (4) Date: Feb. 17, 2009

(87) PCT Pub. No.: WO2008/020399
PCT Pub. Date: Feb. 21, 2008

(65) Prior Publication Data
US 2010/0165221 A1    Jul. 1, 2010

(30) Foreign Application Priority Data
Aug. 17, 2006    (EP) .................................... 06119107

(51) Int. Cl.
*G02F 1/1335* (2006.01)
*G02F 1/1345* (2006.01)
*G09G 3/00* (2006.01)
*G02B 27/22* (2006.01)

(52) U.S. Cl. ............. 349/15; 349/151; 345/32; 359/463
(58) Field of Classification Search .................... 349/15, 349/151; 345/32; 359/463
See application file for complete search history.

(56) References Cited

U.S. PATENT DOCUMENTS

| 6,023,277 | A | 2/2000 | Osaka et al. |
|---|---|---|---|
| 6,064,424 | A | 5/2000 | Van Berkel et al. |
| 6,069,650 | A | 5/2000 | Battersby |
| 6,094,216 | A | 7/2000 | Taniguchi et al. |
| 6,710,920 | B1 * | 3/2004 | Mashitani et al. ............ 359/463 |
| 6,970,290 | B1 * | 11/2005 | Mashitani et al. ............ 359/462 |
| 7,066,599 | B2 * | 6/2006 | Hattori et al. ..................... 353/7 |
| 7,250,923 | B2 * | 7/2007 | Taira et al. ........................ 345/6 |
| 2005/0062905 | A1 | 3/2005 | Kim et al. |
| 2005/0073577 | A1 | 4/2005 | Sudo et al. |

FOREIGN PATENT DOCUMENTS

| DE | 19822342 A1 | 12/1999 |
|---|---|---|
| EP | 0833183 A1 | 4/1998 |
| EP | 1427222 A2 | 6/2004 |
| EP | 1489858 A2 | 12/2004 |
| GB | 2196166 A | 4/1988 |
| WO | 0178409 A2 | 10/2001 |

* cited by examiner

Primary Examiner — Mike Qi
(74) Attorney, Agent, or Firm — Larry Liberchuk

(57) ABSTRACT

A multi-view autostereoscopic display device (101) comprises: an image forming means (103); a view forming means (109,117); and a driving means (119). The driving means is arranged to: in a first portion of a driving cycle, drive a first group of display pixels (105) with display data for a first plurality of views and in a second portion of the driving cycle, drive the first group of display pixels with display data for a second plurality of views The second plurality of views are projected in different directions to the first plurality of views, thereby broadening a viewing angle of the device.

28 Claims, 9 Drawing Sheets

107, 109

107, 109

MULTI-VIEW AUTOSTEREOSCOPIC DISPLAY DEVICE HAVING PARTICULAR DRIVING MEANS AND DRIVING METHOD

FIELD OF THE INVENTION

This invention relates to an autostereoscopic display device comprising an image forming means, such as a display panel having an array of display pixels, and a view forming means. The view forming means may be an array of lenticular elements arranged over the image forming element through which the display pixels are viewed. The invention also relates to a method of driving an autostereoscopic display device.

BACKGROUND OF THE INVENTION

A known autostereoscopic display device is described in GB 2196166 A. This known device comprises a two dimensional liquid crystal display panel having a row and column array of display pixels acting as an image forming element to produce the display. An array of elongate lenticular elements extending parallel to one another overlies the display pixel array and acts as a view forming element. The display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image.

In other arrangements, each lenticule is associated with a group of three or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are perceived creating, for example, a look-around impression.

Document US-B1-6710 920 discloses a multi-view autostereoscopic display device comprising an image forming means, a view forming means having an array of view forming elements, and a driving means.

The above described devices provide an effective three dimensional display. However, it will be appreciated that, in order to provide stereoscopic views, there is a necessary sacrifice in the horizontal resolution of the device. For example, a display panel having an array of 600 rows and 800 columns of display pixels may provide a four-view autostereoscopic display in which each view comprises an array of 600 rows and 200 columns of display pixels. This substantial difference between vertical and horizontal resolution is undesirable.

Furthermore, it will also be appreciated that there is a trade off between the viewing angle of the display and the perception of three dimensional depth in the display. In particular, to provide a display having a wide viewing angle, it is necessary to distribute the projected views over a large angle, for example 60°. However, such a display provides a shallow three dimensional image with little perception of depth. In contrast, in order to provide a realistic three dimensional image with good depth, it is necessary to concentrate all of the projected views across a small viewing angle. It can be shown that the depth range within which a three dimensional display is perceived without excessive blurring is approximately proportional to $n/\tan(\theta/2)$, where n is the number of views and $\theta$ is the viewing angle of the display.

SUMMARY OF THE INVENTION

It is an object of the invention to provide a display having a good image resolution, a wide viewing angle and a good perception of depth.

The invention is defined by the independent claims. The dependent claims provide advantageous embodiments.

The invention provides a multi-view autostereoscopic display device according to claim 1 of the type that has an image forming means and a view forming means. The device comprises a driving means arranged to sequentially drive each pixel with information for different views. The different views are projected in different directions by switching the view forming elements between transmitting and shielding states, in synchronisation with the driving of the display pixels. The different views are thereby sequentially projected through different ones of the view forming elements, at respective different angles. The second plurality of views are projected in different directions to the first plurality of views. In this way, a viewing angle of the device may be broadened.

The invention thus provides a multi-view autostereoscopic display device in which the number of views and the viewing angle are multiplied, without any sacrifice in display resolution. This is essentially achieved by sequentially driving the image forming means with information for different views, and by switching view forming elements of a view forming means to control the angle at which the views are projected. The display device thus provides a user with a greater perception of depth and/or has a greater viewing angle. Provided that the frame rate of the image forming means (and the switching rate of the view forming means) is not too low, the user should not detect any degradation in the image quality.

In the first portion of the driving cycle, the first plurality of views are observable through the first (transmitting) view forming element. However, these views are also observable through others of the view forming elements that are in the transmitting state. These views are repeated views projected in different directions. Similarly, in the second portion of the driving cycle, the second plurality of views are observable through a few of the view forming elements, including the second view forming element, that are in the transmitting state at that time. Again, these views are repeated views.

In embodiments of the invention, the image forming means comprises a liquid crystal display panel or a plasma display panel. These types of display panels can be driven at high frame rates, so as to prevent any degradation in image quality such as frame flicker.

In certain embodiments, the view forming means comprises a spatially switchable backlight for the image forming means. The view forming effect is provided by spacing the backlight from the image forming means by an effective distance, and illuminating particular portions of the backlight.

In other embodiments, the view forming means comprises an array of view forming elements in the form of transmissive slits or lenticular lenses. The slits or lenses are preferably arranged with their main axis parallel, or at an acute angle, to the column direction of the image forming means.

Lenticular lenses are particularly preferred as the view forming elements because they provide a display device having a good level of brightness. Each view forming element is preferably provided as a whole lenticular lens but, in some embodiments, portions of one or more lens may form the view forming element.

In certain embodiments, the view forming elements each comprise liquid crystal material arranged to be switchable between the transmissive and shielding states. More specifically, the view forming elements may each comprise liquid crystal material provided between liquid crystal alignment layers, transparent electrodes and polarisation films. The polarisation directions of the polarisation films are preferably arranged to be substantially perpendicular to each other. The switching function is then provided by applying a voltage across the electrodes, which gives rise to an electric field causing the liquid crystal material to assume different orientations in relation to the polarisation films.

Alternatively, in other embodiments, the view forming means further comprises a spatially switchable barrier arranged in series with the array of view forming elements to provide the transmissive and shielding states. In this case, the spatially switchable barrier is preferably positioned as close as possible to the array of view forming elements.

For example, the spatially switchable barrier may comprise: a light polarizing layer, arranged between the image forming means and the array of view forming elements, so that light from the image forming means is polarized in a first direction; retarders formed in registration with a number of the view forming elements for changing the polarisation direction of the light transmitted therethrough from the first direction to a second direction; and an optical arrangement arranged to selectably block light polarized in the first and second directions, wherein elements of the spatially switchable barrier are arranged to be switched between the transmissive and shielding states by changing the polarization direction of light blocked by the optical arrangement. The light polarizing layer of the barrier may form a functional part of the image forming means.

In this case, the optical arrangement may comprise a rotator means for selectably changing the polarization direction of light and a polarizing layer for blocking the transmission of light polarized in the first or second direction.

In one embodiment, the view forming function of the view forming elements (111) is switchable, and the driving means (119) is arranged to provide a two dimensional mode of operation in which the view forming elements (111) and/or the spatially switchable barrier (117) is/are switched to be transmissive and to not perform the view forming function, and the driving means (119) is arranged to drive the image forming means (103) with display data for a single view. In this one embodiment the view forming function of the view forming elements is switchable between an "off" state in which no view forming effect is provided and an "on" state in which a view forming effect is provided. This may be realised, for example, by providing liquid crystal lenticular elements having a refractive index that is switchable between two values. A first value of the refractive index is the same as the refractive index of an interfacing material, and a second value of the refractive index is different to the refractive index of the interfacing material. The view forming effect is only provided when there is a difference in refractive index at the interface.

If the view forming function is switchable in this way, then driving means may be arranged to provide a two dimensional mode of operation in which the view forming elements and/or the spatially switchable barrier are/is switched to be transmissive and not to perform the view forming function, and in which the driving means is arranged to drive the image forming device with display data for a single view. In this way, the device may operate as a conventional two dimensional display having a higher horizontal resolution. Such a mode is useful for monitor applications, for example.

In a preferred embodiment, each group of display pixels is associated with two view forming elements, so that the output of each group is observable through the two view forming elements alternately. Such a device has twice as may views as a conventional autostereoscopic display device. Each group of display pixels may be located, in the horizontal direction, midway between the two view forming elements with which it is associated. In these embodiments, an image forming means having a frame rate of at least 100 Hz is preferred, so as to prevent screen flicker.

In embodiments, the view forming elements may be slanted at an angle to the column direction of the image forming means. In this way, the resolution loss required to provide the multiple views may be shared between the horizontal and vertical directions. The display pixels of the image forming means are preferably arranged in orthogonal rows and columns.

In a particular embodiment, the view forming elements of the view forming means may be switchable between transmissive and shielding states by altering a polarisation direction of light from a backlight, and providing an arrangement of polarisation and retarder layers through which the light must pass.

In particular, in this embodiment, the view forming means comprises a spatially switchable backlight, with the view forming elements comprising transmissive slits spaced in the horizontal direction, which slits are formed in a barrier arranged between the backlight and the image forming means. More specifically, the backlight comprises an array of polarised light sources arranged to provide light having alternating polarisation directions in the horizontal direction. Alternating ones of the slits are provided with retarders, for example half wave retarders, for changing the polarisation direction of light transmitted therethrough. The view forming means further comprises a polarisation layer arranged between the barrier and the image forming means. In use, light having different polarisation directions, i.e. from different ones of the light sources, is selectively transmitted through different ones of the slits as a result of the polarising layer.

The polarisation layer may form functional parts of both the image forming means and the view forming means. This may be the case, for example, if the image forming means is a liquid crystal display panel.

In this embodiment, the view forming elements, which are in the form of the slits, are configurable to focus the output of the groups of display pixels in the sense that light from the backlight is confined through the slits, to thereby form the views. These views are observable through these view forming elements in the sense that the light from the backlight, which is formed into the views, is transmitted through the slits.

In preferred embodiments, the driving means is arranged to switch the view forming elements such that, in each of the first and second portions of the driving cycle, the view forming elements having the transmitting state and the shielding state are distributed alternately in the row direction and the column direction of the display pixels. By switching the view forming elements in this way, undesirable effects associated with interlaced driving, such as line crawling, may be avoided.

The invention also provides a method of driving a multi-view autostereoscopic display device, the device comprising an image forming means having an array of display pixels arranged in rows and columns for producing a display, and a view forming means positioned in registration with the image forming means and having an array of view forming elements each being configurable to focus the output of groups of the display pixels into a plurality of views projected in different horizontal directions, the method comprising:

in a first portion of a driving cycle, driving a first group of display pixels with display data for a first plurality of views and switching first and second view forming elements that are horizontally adjacent to each other to transmitting and shielding states respectively, so that the first plurality of views can be observed through the first view forming element; and in a second portion of the driving cycle, driving the first group of display pixels with display data for a second plurality of views and switching the first and second view forming elements to shielding and transmitting states respectively, so that the second plurality of views can be observed through the second view forming element.

The second plurality of views are projected in different directions to the first plurality of views. In this way, a viewing angle of the device may be broadened.

In embodiments, the switching between the transmitting and shielding states of the view forming elements comprises applying an electric field across a liquid crystal material.

The second portion of the driving cycle may be immediately followed by a first portion of a subsequent driving cycle, so that the output of each group of pixels is observable through the two view forming elements alternately. In this way, the number of views provided is doubled, as compared to a conventional autostereoscopic display device.

The image forming means is preferably driven at a frame rate of at least 100 Hz, so as to minimise screen flicker.

The method may further comprise providing a two dimensional mode of operation in which: the view forming elements is switched to be transmissive and to not perform the view forming function; and the driving means drives an image forming means with display data for a single view. In this way, the device operates as a conventional two dimensional display device.

The invention also provides a display driver according to claim 15 for a multi-view autostereoscopic display device, the display device comprising an image forming means having an array of display pixels arranged in rows and columns for producing a display, and a view forming means positioned in registration with the image forming means and having an array of view forming elements each being configurable to focus the output of groups of the display pixels into a plurality of views projected in different horizontal directions, wherein the display driver is for driving the image forming means with display data and for switching the view forming elements of the view forming means, and wherein the display driver is arranged to:

in a first portion of a driving cycle, drive a first group of display pixels with display data for a first plurality of views and switch first and second view forming elements that are horizontally adjacent to each other to transmitting and shielding states respectively, so that the first plurality of views can be observed through the first view forming element; and in a second portion of the driving cycle, drive the first group of display pixels with display data for a second plurality of views and switch the first and second view forming elements to shielding and transmitting states respectively, so that the second plurality of views can be observed through the second view forming element.

U.S. Pat. No. 6,064,424 discloses an autostereoscopic display device similar to that described above, except that the elongate lenticular elements are slanted at an angle to the column direction of the display panel. By slanting the lenticular elements, some of the reduction in horizontal resolution, which would otherwise be required, is transferred to the vertical resolution. It thus becomes possible to "consume" both vertical and horizontal resolution to increase the number of views displayed by the device. Nevertheless, it is still necessary to sacrifice resolution to obtain a display having a wide viewing angle and/or a good perception of depth.

EP 1489858 A2 also discloses an autostereoscopic display device similar to that described above, except that a spatially switchable light barrier is additionally provided between the display panel and the array of lenticular elements. In use, the light barrier is controlled to provide a plurality of slit regions aligned with the lenticular elements, each slit region being switched between a transmitting state and a shielding state in a predetermined cycle. In synchronisation with the switching of the slit regions, the display panel is driven with different parts of the image data for a plurality of views. The switching and driving cycle is sufficiently short for a user to observe all of the image data for the views, the eyes of the user integrating the different parts of the image data for each view across the cycle. It thus becomes possible to provide an autostereoscopic display device having multiple views, without any reduction in resolution. However, there remains a trade off between the viewing angle of the display and the perception of depth in the display.

BRIEF DESCRIPTION OF THE DRAWINGS

Embodiments of the invention will now be described, purely by way of example, with reference to the accompanying drawings, in which.

DETAILED DESCRIPTION OF EMBODIMENTS

The invention provides a multi-view autostereoscopic display device of the type that has an image forming element and a view forming element. The device comprises a driving means arranged to sequentially drive each pixel with information for different views. The different views are projected in different directions by switching the view forming elements of the view forming element between transmitting and shielding states, in synchronisation with the driving of the display pixels. The different views are thereby sequentially projected through different ones of the view forming elements, at respective different angles.

Figure 1:
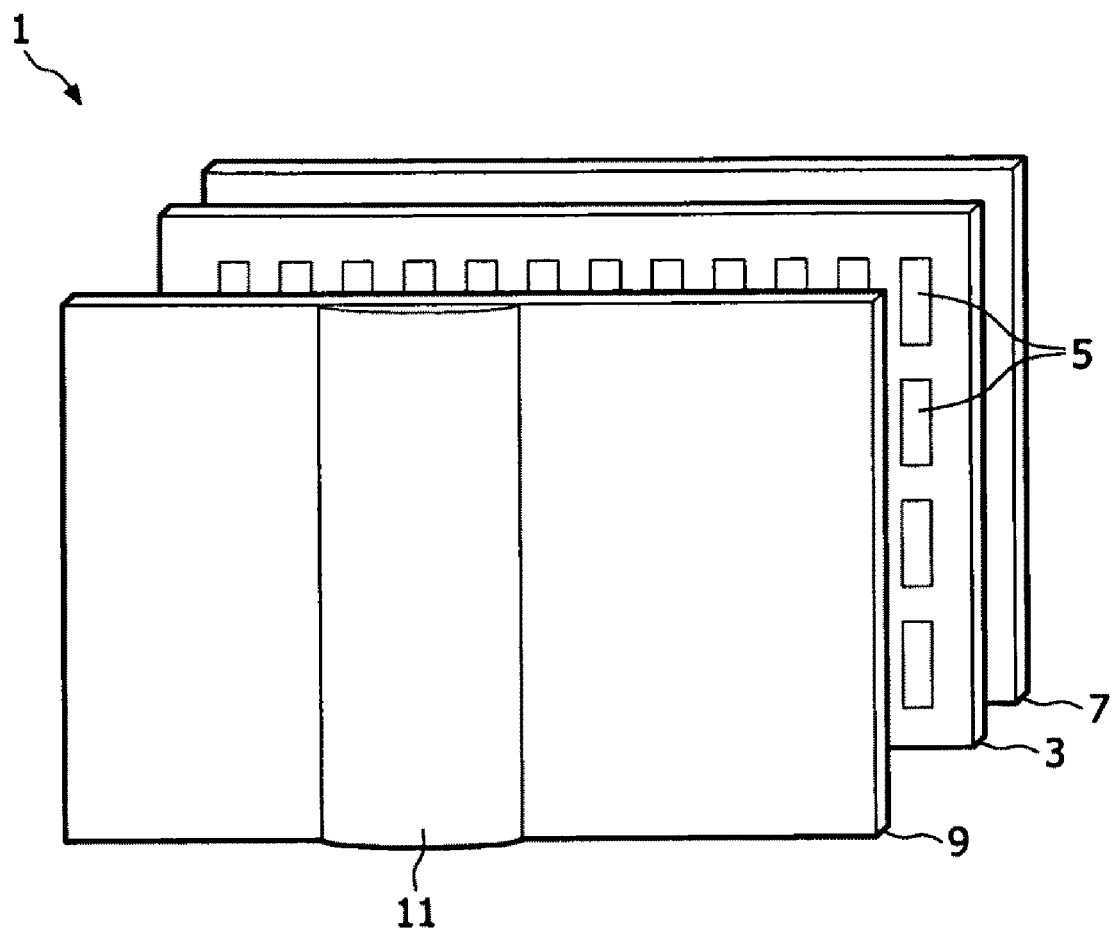
FIG. 1 is a schematic perspective view of a known autostereoscopic display device.

FIG. 1 is a schematic perspective view of a known multi-view autostereoscopic display device 1. The known device 1 comprises a liquid crystal display panel 3 of the active matrix type that acts as an image forming means to produce the display.

The display panel 3 has an orthogonal array of display pixels 5 arranged in rows and columns. For the sake of clarity, only a small number of display pixels 5 are shown in the FIG. 1. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity. The lenticular elements 11 act as view forming elements to perform a view forming function.

The lenticular elements 11 are in the form of convex cylindrical lenses, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

Figure 2:
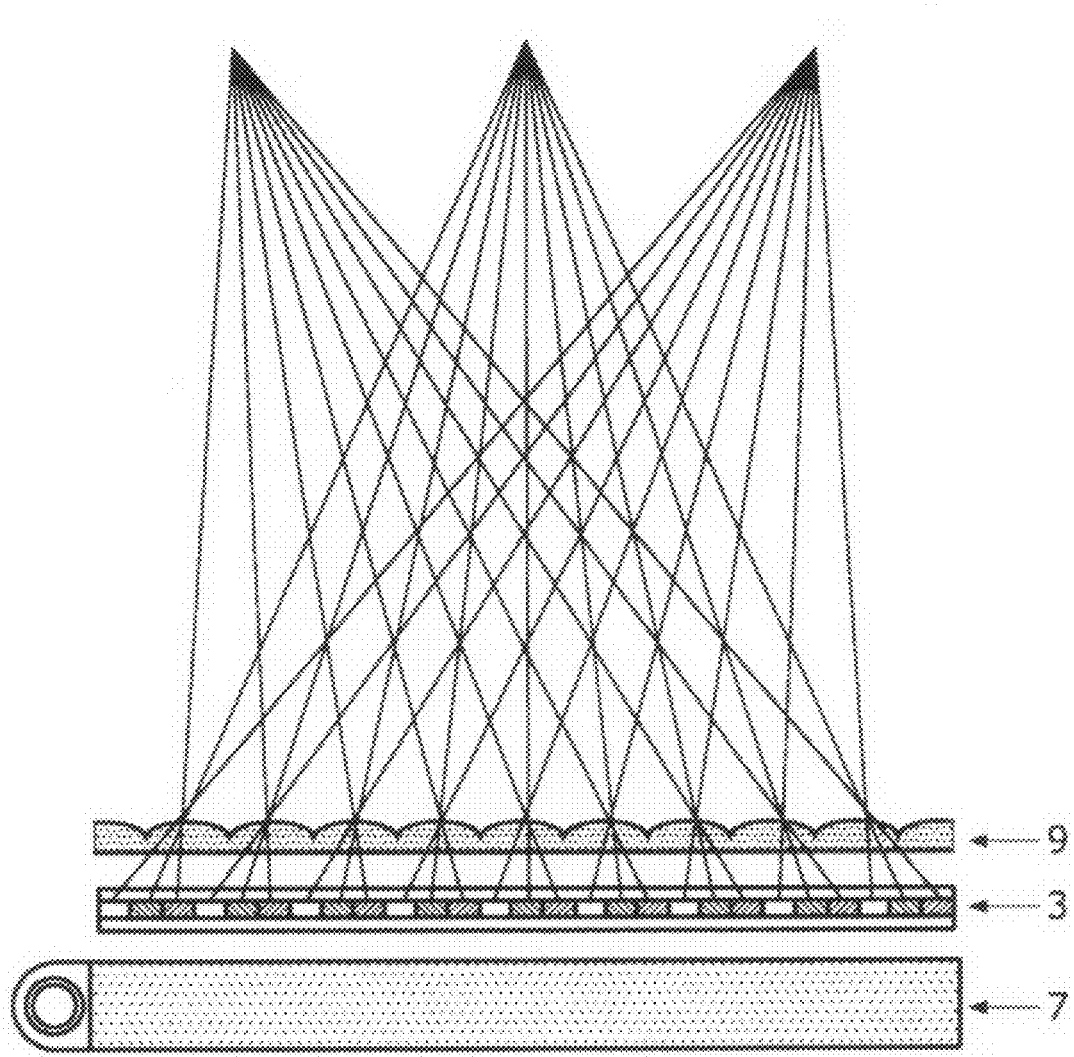
FIG. 2 is a schematic plan view of the display device shown in FIG. 1.

FIG. 2 shows the principle of operation of a lenticular type imaging arrangement as described above and shows the light source 7, display panel 3 and the lenticular sheet 9. The arrangement provides three views each projected in different directions. Each pixel of the display panel 3 is driven with information for one specific view.

Figure 3:
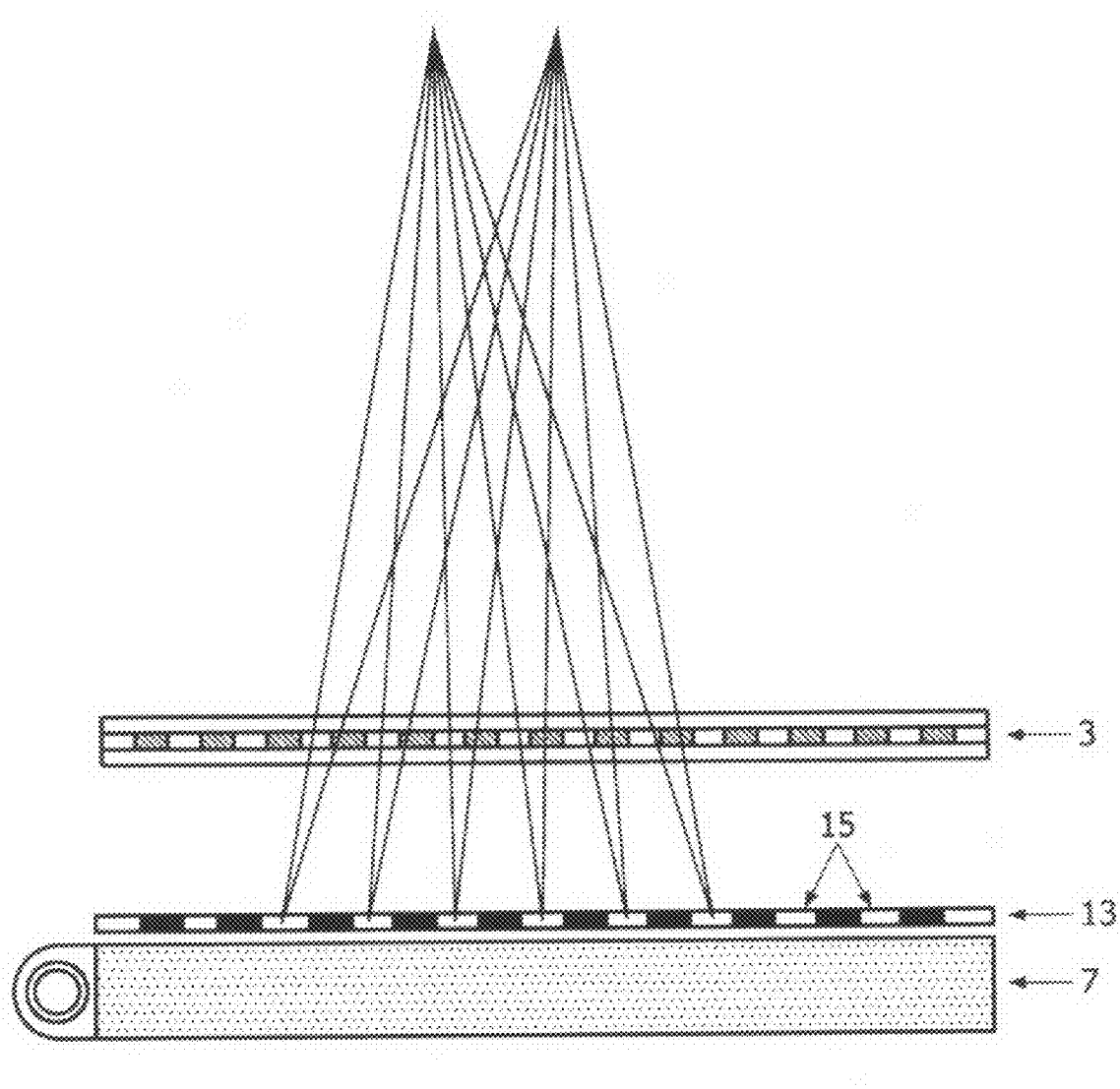
FIG. 3 is a schematic plan view of another known autostereoscopic display device.

FIG. 3 shows the principle of operation of a barrier type imaging arrangement. The barrier type arrangement is similar to the lenticular type arrangement and includes a light source 7 and a display panel 3. However, instead of a lenticular sheet, the barrier type arrangement is provided with a barrier device 13 defining a plurality of narrow slits 15. As shown in the Fig., the barrier type arrangement operates in substantially the same way as the lenticular type arrangement in operating as view forming elements to provide a plurality of views. In the example shown, two views are provided.

The inventor has recognised that the number of views and/or the viewing angle of the above described devices can be increased by sequentially driving the pixels of the display panel with information for more than one view. In doing so, the inventor has recognised and solved a problem of how to direct the output of each pixel in more than one direction.

Figure 4:
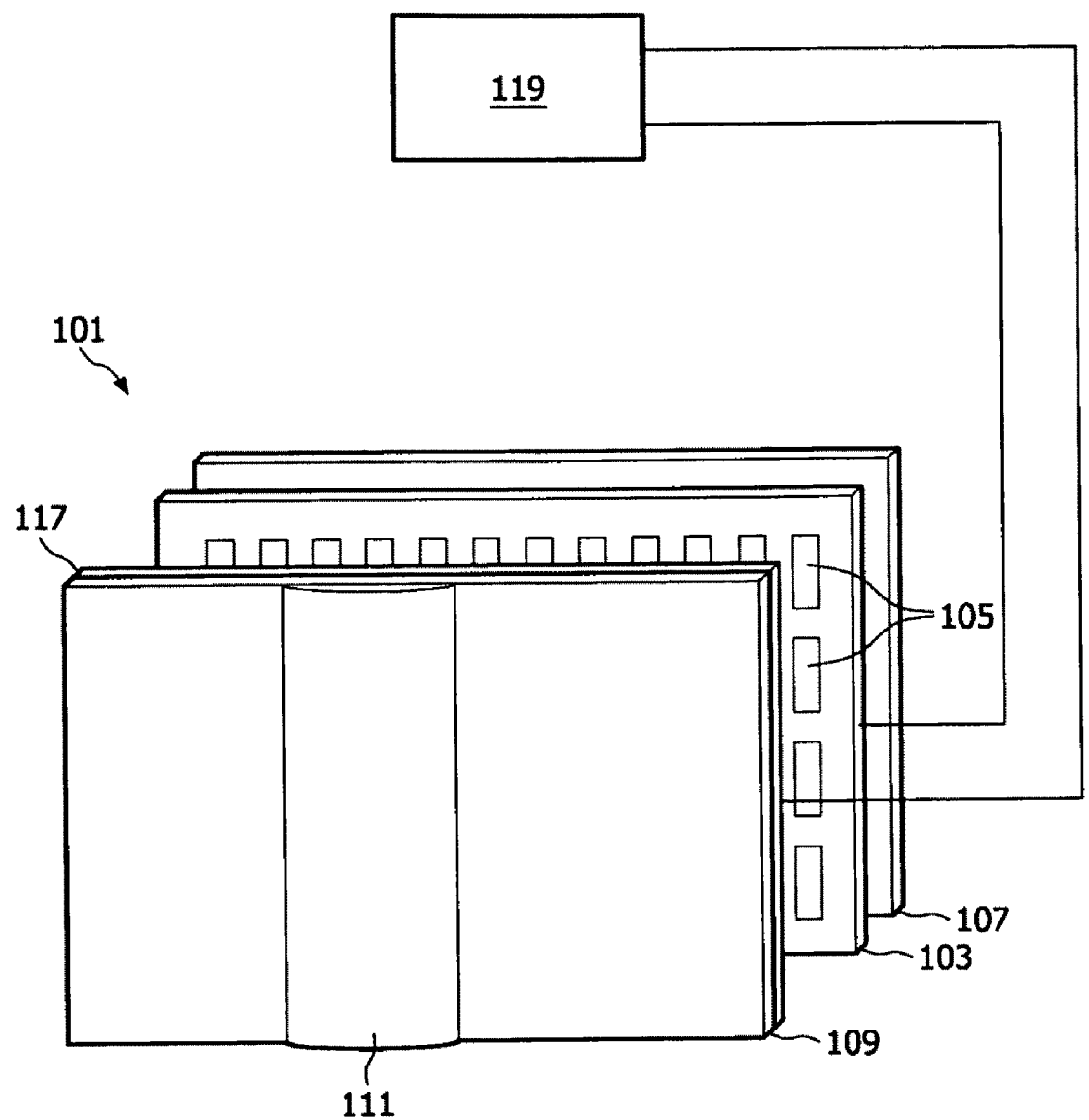
FIG. 4 is a schematic perspective view of an autostereoscopic display device according to the invention.

FIG. 4 is a schematic perspective view of a multi-view autostereoscopic display device 101 according to the invention. The device 101 is similar to the device 1 shown in FIGS. 1 and 2. In particular, the device 101 comprises a display panel 103 performing an image forming function, a light source 107 for the display panel 103, and a lenticular sheet 109 performing a view forming function. These elements are identical to those described above with reference to FIG. 1.

Referring to FIG. 4, it can be seen that the device 101 according to the invention additionally comprises a spatially switchable barrier 117, arranged in series with the lenticular sheet 107, to provide the transmissive and shielding states. The device 101 also includes a display driver 119 for driving the display panel 103 and for switching the barrier 117.

The barrier 117 has a structure that is similar to a transmissive liquid crystal display. In particular, the barrier 117 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

Each switchable barrier element of the barrier 117 comprises opposing electrodes on the substrates, with the intervening liquid crystal material therebetween. The shape and layout of the barrier elements matches the shape and layout of the lenticular elements 111, so that each lenticular element 111 is in registration with a corresponding barrier element.

Each barrier element is associated with a switching element, such as a thin film transistor (TFT) or thin film diode (TFD). The barrier elements are switched between transmissive and shielding states by providing addressing signals to the switching elements, and suitable addressing schemes will be known to those skilled in the art.

The barrier 117 is positioned in contact with the flat side of the lenticular sheet 109, so as to minimise any undesirable parallax effects.

As mentioned above, the display driver 119 is arranged to drive the display panel 103 with information for a plurality of views and to switch the barrier elements of the barrier 117 between transmitting and shielding states. The display driver 119 is arranged to perform this driving using a particular driving technique, which will now be described with reference to FIGS. 5A, 5B, 6A and 6B.

Figure 5A:
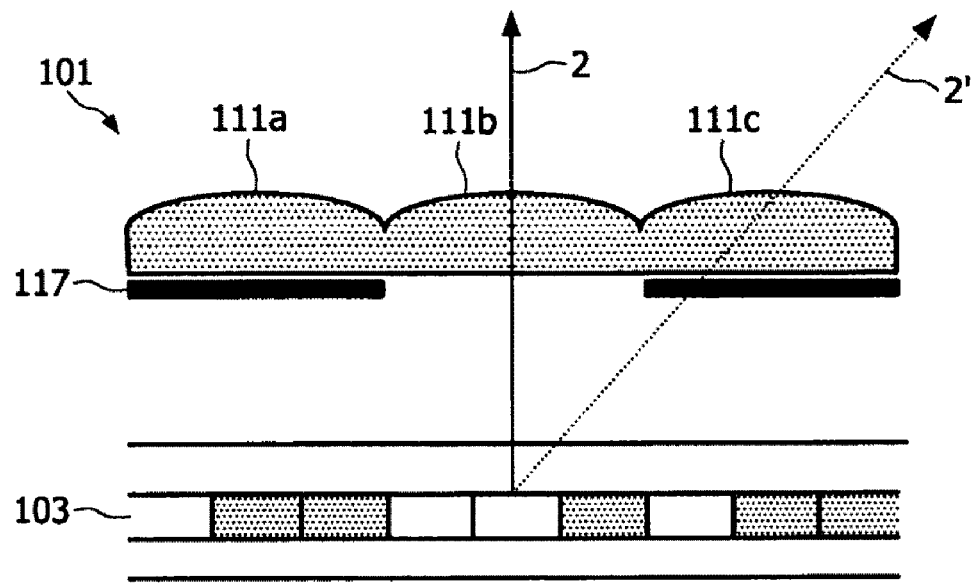
FIGS. 5A and 5B are views used to explain the operation of the display device shown in FIG. 4.
Figure 5B:
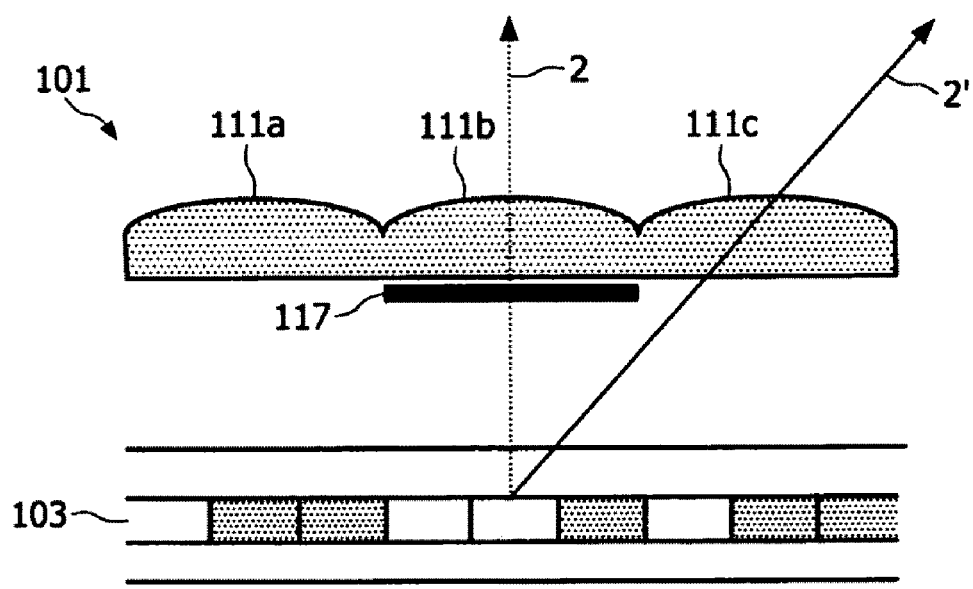
Figure 6A:
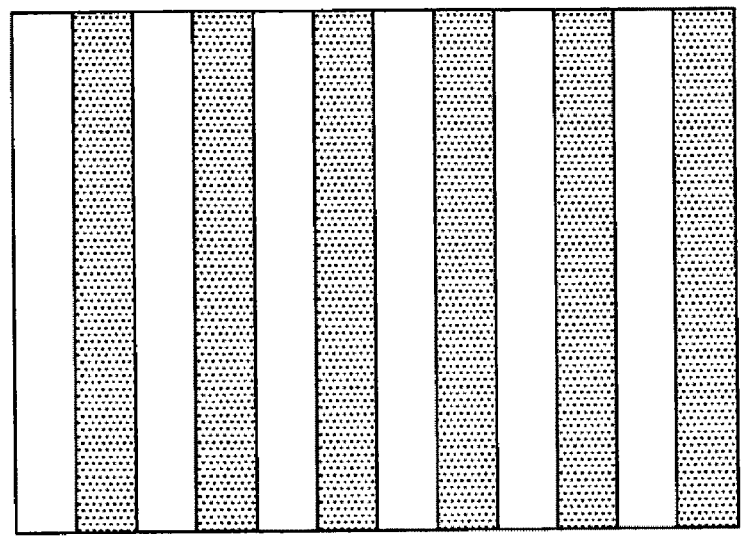
FIGS. 6A and 6B are further views used to explain the operation of the display device shown in FIG. 4.
Figure 6B:
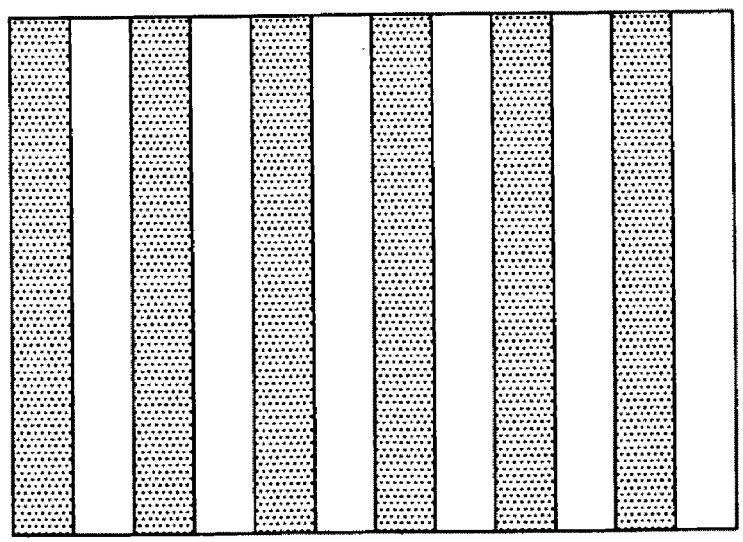

FIGS. 5A, 5B, 6A and 6B show the principle of operation of the device 101 according to the invention. FIGS. 5A and 6A show the device 101 during a first half of a driving cycle and FIGS. 5B and 6B show the device during a second half of a driving cycle.

As shown in FIGS. 5A and 5B, each lenticular element 111a, 111b, 111c overlies a group of three display pixels of the display panel 103. Each group of pixels is therefore capable of projecting the output for three different views simultaneously, which output is formed into the separate views by a lenticular element. The barrier 117 is provided directly below and in contact with the lenticular elements 111 so that it is able to switch the lenticular elements 111 between transmissive and shielding states.

Referring to FIG. 5A, in a first half of the driving cycle, the display driver 119 switches alternate ones of the barrier elements of the barrier 117 to a transmissive state, and the remaining elements are switched to a shielding state. In FIG. 5A, which shows a portion of the device 101 comprising three lenticular elements 111a, 111b, 111c, the two outer lenticular elements 111a, 111c are shielding and the central lenticular element 111b is transmissive. This configuration of the barrier elements and lenticular elements is shown in FIG. 6A, which shows a larger area of the device 101, and in which the odd elements are transmissive and the even elements are shielding (shaded).

Substantially at the same time as switching the barrier elements to the configuration described above, the display driver 119 drives the group of pixels underlying the central lenticular element 111b with information for a first three views, i.e. views 1, 2, 3. In particular, each pixel in the group is driven with information for a pixel of a different one of the three views. The outputs for the three different views are projected in different directions by the central lenticular element 111b in the conventional way. In the Fig., in the interests of clarity, only the output for view 2 is shown. The dotted line represents the projection of a view that is blocked by a lenticular element that is in the shielding state.

The outputs from the three views are also projected through other ones of the lenticular elements (not shown) that are simultaneously in the transmissive state. These views are effectively "repeated" views.

Referring to FIG. 5B, in a second half of the driving cycle, the display driver 119 switches all of the barrier elements of the barrier 117 to the opposite state. Thus, barrier elements that were transmissive in the first half of the driving cycle are switched to be shielding, and vice versa. In FIG. 5B, which shows the same portion of the device 101 shown in FIG. 5A, the two outer lenticular elements 111a, 111c are transmissive and the central lenticular element 111b is shielding. This configuration of the barrier elements and lenticular elements is shown in FIG. 6B, which shows a larger area of the device 101, and in which the even elements are transmissive and the odd elements are shielding (shaded).

Substantially at the same time as switching the barrier elements to the configuration described above, the display driver 119 drives the group of pixels underlying the central lenticular element 111b with information for a second three views, i.e. views 1', 2', 3' that are different to the first three views 1, 2, 3. In particular, each pixel in the group is driven with information for a pixel of a different one of the three additional views. The outputs for these three additional views are projected in different directions by lenticular elements, as was the case for the first three views in the first half of the driving cycle. However, in the second half of the driving cycle, the central lenticular element 111b has been switched to the shielding state and so the three additional views are projected in different directions by the outer lenticular elements 111a, 111c. In the Fig., in the interests of clarity, only the output for view 2' is shown. The dotted line represents the projection of a view that is blocked by a lenticular element that is in the shielding state. Repeated views are also projected through other ones of the lenticular elements (not shown) that are simultaneously in the transmissive state Thus, across the whole of the driving cycle, the group of three display pixels underlying the central lenticular element 111b are driven with and provide an output for six different views. These views are projected in different directions by different lenticular elements 111a, 111b, 111c. In particular, a first three of the views are projected through the central lenticular element 111b (and others) and a second three of the views are projected through the outer lenticular elements 111a and 111c (and others). The use of different lenticular elements to project the outputs of each pixel ensures that, not only is the total number of views multiplied, but the viewing angle of the display device 101 is increased.

With reference to FIGS. 5A and 5B, it is noted that the pixels underlying the outer lenticular elements 111a, 111c are driven with data, and operate, in a similar way to the display pixels underlying the central lenticular element 111b described above. In particular, in both portions of the driving cycle, pixels underlying lenticular elements that are in the transmissive state are driven with information for the first three views 1, 2, 3, which views are projected by a lenticular element positioned directly above. Pixels underlying lenticular elements that are in the shielding state are driven with information for the second three views 1', 2', 3', which views are projected by the lenticular element directly to the left and to the right of the pixels. The views 1', 2', 3' projected through the lenticular element to the left and to the right of the pixels are repeated views, i.e. they are the same.

As will be appreciated by the skilled person, at any one time, information for half of the views is being projected by the device 101. Thus, provided the frame rate of the device is sufficiently high, a user will not notice any screen flicker, no matter which of the six views are being observed.

The display panel 103 in this embodiment is a liquid crystal display device having a frame rate of 100 Hz. Such a frame rate may be achieved for example using the optically compensated birefringent (OCB) liquid crystal effect, details of which will be known to the skilled person.

It will also be appreciated that the use of each pixel to sequentially output the information for two different views causes there to be no reduction in display resolution, as compared to a conventional autostereoscopic display device.

Figure 7A:
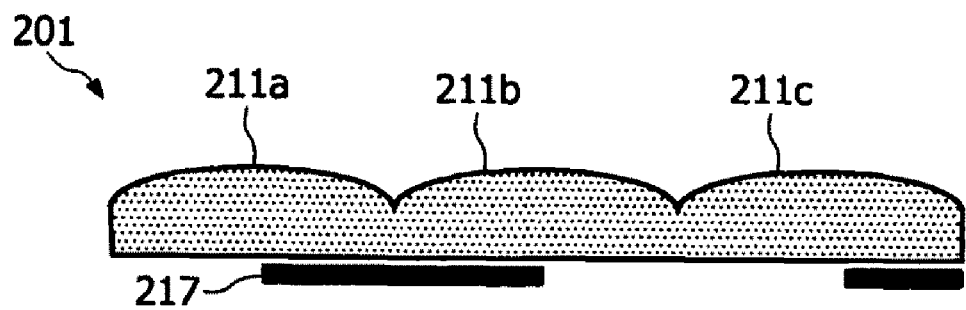
FIGS. 7A and 7B are schematic plan views of another autostereoscopic display device according to the invention.
Figure 7B:
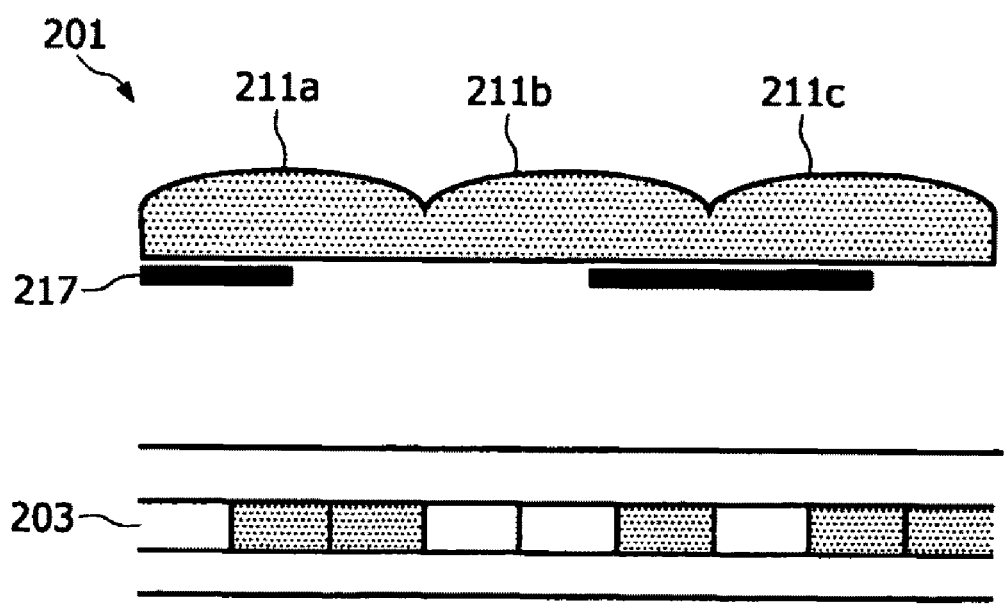

FIGS. 7A and 7B show a second multi-view autostereoscopic display device 201 according to the invention. This device 201 is the same as the device 101 described above, except that the switching of the barrier 217 does not correspond with the arrangement of lenticular elements 211a, 211b, 211c. Instead, the transmissive and shielding portions of the barrier 217 are effectively shifted with respect to the lenticular sheet 211. The skilled person will appreciate that the data with which the display panel 203 is driven is modified, as compared with the data with which the display panel 103 of the device shown in FIG. 4 is driven.

The embodiment shown in FIGS. 7A and 7B provides display in which the effective resolution is doubled. In particular, when a user views a known multiple view autostereoscopic display device of the type shown in FIG. 2, each pixel appears as large as a width of a lenticular element. However, with the embodiment shown in FIGS. 7A and 7B, only one half of the lenticular element contributes to the display in the first portion of the driving cycle. The other half of the lenticular element contributes to the display in the second portion of the driving cycle. In this embodiment, the horizontal resolution is thus effectively doubled.

Figure 8A:
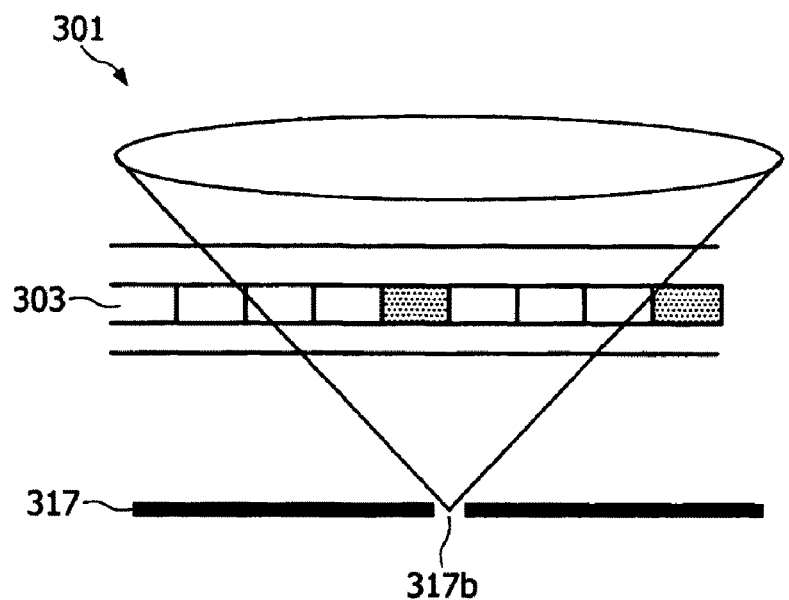
FIGS. 8A and 8B are schematic plan views of another autostereoscopic display device according to the invention.
Figure 8B:
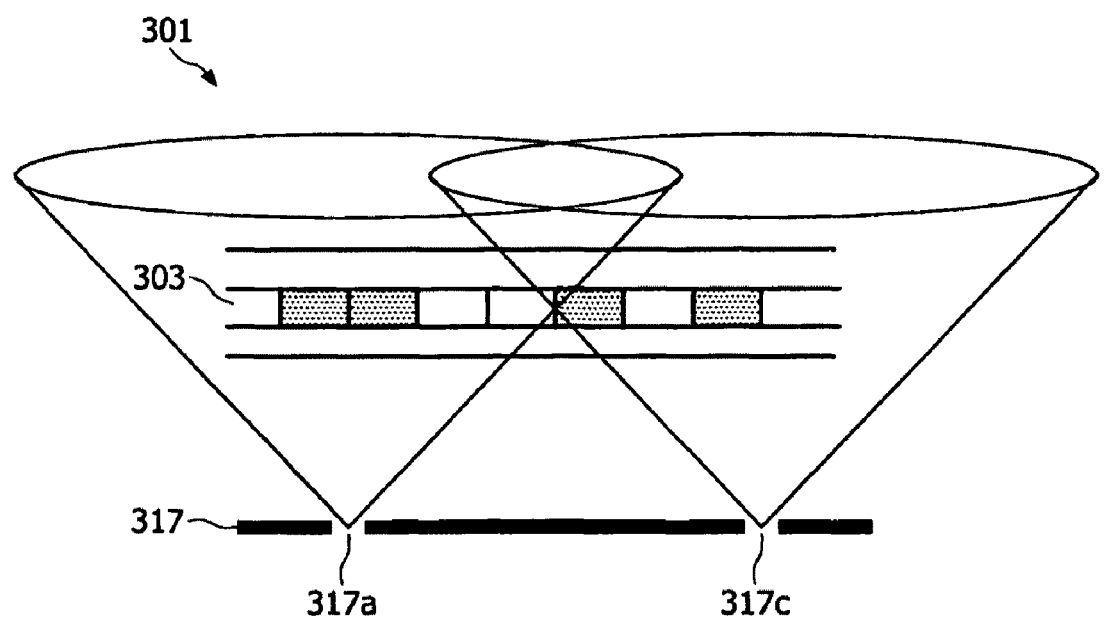

FIGS. 8A and 8B show a third multi-view autostereoscopic display device 301 according to the invention. This device 301 is the same as the device 101 described above, except that the lenticular sheet 103 and the switchable barrier 117 are substituted by a single switchable barrier 317, which provides the view forming function using a plurality of narrow slits 317a, 317b, 317c and is switchable between transmissive and shielding states. The barrier 317 is located behind the display panel 303. The third device 301 can additionally be operated in a two dimensional mode as a conventional two dimensional display device simply by switching the barrier 317 to be entirely transmissive.

Figure 9:
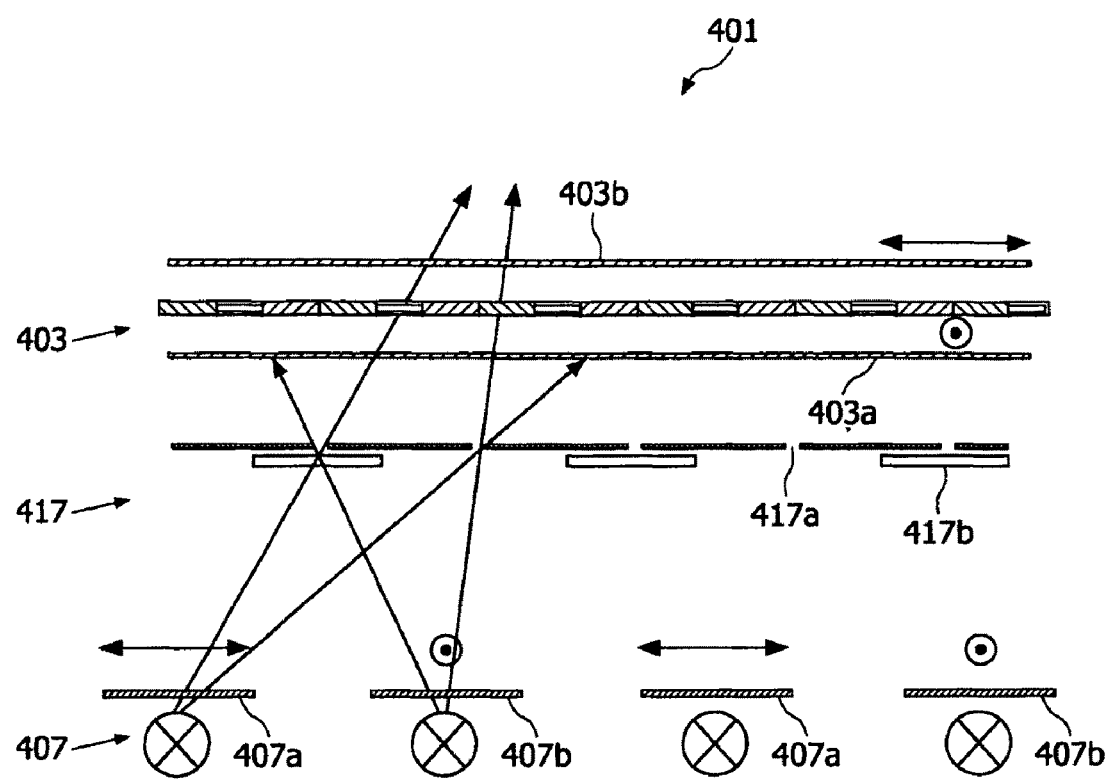
FIG. 9 is a schematic plan view of another autostereoscopic display device according to the invention.

FIG. 9 shows a fourth multi-view autostereoscopic display device 401 according to the invention. The device 401 comprises a conventional liquid crystal display panel 403 having an array of display pixels, which provides the image forming function. The display panel 403 comprises a plurality of layers, including a polariser 403a and an analyser 403b. In the Fig., the display panel 403 is arranged so that the polariser 403a blocks light that is not polarised perpendicular to the plane of the drawing, i.e. it only transmits light which is polarized in this direction.

As a view forming means, the fourth device 401 comprises an array of light sources 407 arranged in registration with a light barrier 417 formed with narrow slits 417a, which slits 417a are the view forming elements. There are somewhat fewer light sources 407 than there are slits 417a. The polariser 403a of the display panel 403 also forms a functional part of the view forming means.

The light sources 407 are each arranged to produce polarised light and, for this purpose, each light source 407 includes a polariser 407a, 407b. The light sources 407 are arranged in the horizontal direction with polarisers 407a, 407b having alternating polarisation directions, as shown in the FIG. 3. In particular, a first group of the polarisers 407a polarise light in a direction parallel to the plane of the drawing and a second group of the polarisers 407b polarise light in a direction perpendicular to the plane of the drawing. The number of light sources 407 is not critical, provided that reasonably uniform light of each polarization direction can be produced.

The plurality of narrow slits 417a of the light barrier 417 are arranged to transmit light. Alternate ones of the slits 417a are provided with a half wave retarder 417b for changing the polarisation direction of the light passing through the slit 417a.

In use, the display panel 403 is sequentially driven with display data for different pluralities of views, as is the case with the device 101 described above. In synchronisation with this driving, the light sources 407 having the different polarisers 407a, 407b are sequentially energised, so that the light sources 407 generate light having alternating polarisation directions.

In the first portion of the driving cycle, the light sources 407 having polarisers 407a are energised. As shown in the FIG. 3, polarised light from these light sources is transmitted through the slits 417a of the barrier 417, with the light transmitted through alternate ones of the slits 417a having its polarisation direction changed by the retarders 417b. The polariser 403a of the display panel 403 only transmits the light that is polarised perpendicular to the plane of the drawing, i.e. light that has been transmitted by alternate ones of the slits 417a of the barrier 417. This light is transmitted through the display pixels to form a first plurality of views.

In the second portion of the driving cycle, the light sources having polarisers 407b are energised. As shown in the FIG. 3, the light from these sources is transmitted and polarised in a similar way to that described above, except that the polariser 403a of the display panel transmits polarised light that has been transmitted by different ones of the slits 417a. This light, from different ones of the slits 417a, is transmitted through the display pixels to form a second plurality of views.

Thus, in effect, the light sources 407, the light barrier 417 and the polariser 403a of the display panel 403 effectively function as an array of view forming elements switchable between transmitting and shielding states. The switching is performed by altering the polarisation direction of the light from the light sources 407.

Preferred embodiments of the invention have been described above. However, it will be apparent to the skilled person that various changes and modifications may be made to the embodiments without departing from the invention, the scope of which is defined by the accompanying claims.

For example, the embodiment shown in FIG. 4 that comprises a lenticular sheet as a view forming means may be modified to additionally provide a two dimensional mode of operation, similar to that provided by the embodiment shown in FIGS. 8A and 8B. This may be achieved by providing a lenticular sheet in which the lenticular elements are switchable between an "off" state in which no view forming effect is provided and an "on" state in which a view forming effect is provided. This may be realised, for example, by providing liquid crystal lenticular elements having a refractive index that is switchable between two values. A first value of the refractive index is the same as the refractive index of an interfacing material, and a second value of the refractive index is difference to the refractive index of the interfacing material. The view forming effect is only provided when there is a difference in refractive index at the interface. Further details of the structure and operation of suitable switchable lenticular elements can be found in U.S. Pat. No. 6,069,650.

In certain embodiments, the lenticular elements and/or the switched portions of the switchable barrier may be slanted with respect to the column direction of the display panel. In this way, any disparity between horizontal and vertical resolution can be reduced. Further information regarding the use of slanted lenticular elements can be found in U.S. Pat. No. 6,064,424.

Embodiments having a different number of views will be apparent to the skilled person. This may be achieved by providing a different number of pixels so that a different number of views can be simultaneously projected from the device, or by sequentially driving each pixel with the information for a different number of views. The angular direction of the views may be adjusted by altering the relative locations of the display pixels, the switchable barrier and the lenticular elements.

In the embodiments described above, the barrier elements are driven actively by thin film transistors or thin film diodes. However, in these and certain other embodiments, it is also suitable to passively drive the barrier elements without the transistors or diodes using a simple arrangement of comb-like electrode patterns on one substrate and a continuous electrode on the other substrate.

The invention claimed is:

1. A multi-view autostereoscopic display device (101) comprising:
    an image forming means (103) having an array of display pixels (105) for producing a display, the display pixels (105) being arranged in rows and columns;
    a view forming means (109, 117) positioned in registration with the image forming means (103) and having an array of view forming elements (111) that are switchable between a transmitting state and a shielding state, the view forming elements (111) each being configurable to focus the output of groups of the display pixels (105) into a plurality of views projected in different horizontal directions; and
    a driving means (119) arranged to drive the image forming means (103) with display data and to switch the view forming elements (111) of the view forming means (109, 117), wherein the driving means (119) is arranged to:
  in a first portion of a driving cycle, drive a first group of display pixels (105) with display data for a first plurality of views and switch first and second view forming elements (111b, 111c) that are horizontally adjacent to each other to transmitting and shielding states respectively, so that the first plurality of views can be observed through the first view forming element (111b); and
  in a second portion of the driving cycle, drive the first group of display pixels (105) with display data for a second plurality of views and switch the first and second view forming elements (111b, 111c) to shielding and transmitting states respectively, so that the second plurality of views can be observed through the second view forming element (111c).

2. A multi-view autostereoscopic display device according to claim 1, wherein the image forming means (103) comprises a liquid crystal display panel or a plasma display panel.

3. A multi-view autostereoscopic display device according to claim 1, wherein the view forming means (109, 117) comprises a spatially switchable backlight for the image forming means (103).

4. A multi-view autostereoscopic display device according to claim 1, wherein the view forming elements (111) of the view forming means (109, 117) comprise transmissive slits or lenticular lenses.

5. A multi-view autostereoscopic display device according to claim 4, wherein the view forming elements (111) each comprises liquid crystal material arranged to be switchable to provide the transmissive and shielding states.

6. A multi-view autostereoscopic display device according to claim 4, wherein the view forming elements (111) of the view forming means (109, 117) comprise a spatially switchable barrier (117), arranged in series with the array of view forming elements (111), to provide the transmissive and shielding states.

7. A multi-view autostereoscopic display device according to claim 6, wherein the spatially switchable barrier (117) comprises liquid crystal material arranged to be switchable between the transmissive and shielding states.

8. A multi-view autostereoscopic display device according to claim 6, wherein the spatially switchable barrier (117) is positioned against the array of view forming elements (111).

9. A multi-view autostereoscopic display device according to claim 6, wherein the spatially switchable barrier comprises:
  a light polarizing layer (503a), arranged between the image forming means (503) and the array of view forming elements (511), so that light from the image forming means (503) is polarized in a first direction;
  retarders (517a) formed in registration with a number of the view forming elements (511) for changing the polarisation direction of the light transmitted therethrough from the first direction to a second direction; and
  an optical arrangement (517b) arranged to selectably block light polarized in the first and second directions,
  wherein elements of the spatially switchable barrier (517) are arranged to be switched between the transmissive and shielding states by changing the polarization direction of light blocked by the optical arrangement (517b).

10. A multi-view autostereoscopic display device according to claim 9, wherein the optical arrangement (517b) comprises a rotator means for selectably changing the polarization direction of light and a polarizing layer for blocking the transmission of light polarized in the first or second direction.

11. A multi-view autostereoscopic display device according to claim 9, wherein the light polarizing layer (503a) of the spatially switchable barrier forms a functional part of the image forming means (503).

12. A multi-view autostereoscopic display device according to claim 6, wherein the view forming function of the view forming elements (111) is switchable, and wherein the driving means (119) is arranged to provide a two dimensional mode of operation in which the view forming elements (111) and/or the spatially switchable barrier (117) is/are switched to be transmissive and to not perform the view forming function, and the driving means (119) is arranged to drive the image forming means (103) with display data for a single view.

13. A multi-view autostereoscopic display device according to claim 1, wherein each group of display pixels (105) is associated with two view forming elements (111), so that the output of each group is observable through the two view forming elements alternately.

14. A multi-view autostereoscopic display device according to claim 13, wherein each group of display pixels (105) is located, in the horizontal direction, between the two view forming elements (111) with which it is associated.

15. A multi-view autostereoscopic display device according to claim 13, wherein the frame rate of the image forming means (103) is at least 100 Hz.

16. A multi-view autostereoscopic display device according to claim 1, wherein the view forming elements (111) are slanted at an angle to the column direction of the image forming means (103).

17. A multi-view autostereoscopic display device according to claim 1, wherein the display pixels (105) of the image forming means (103) are arranged in orthogonal rows and columns.

18. A multi-view autostereoscopic display device according to claim 1, wherein the view forming means comprises:
  a backlight (407) arranged to produce light selectably polarized in first and second directions;
  a light barrier (417), arranged between the image forming means (403) and the backlight (407), having the view forming elements in the form of a plurality of narrow slits (417a) arranged in the horizontal direction for transmitting light from the backlight (407), a number of the slits (417a) being arranged to change the polarization direction of light transmitted therethrough; and
  a light polarizing layer (403a), arranged between the image forming means (403) and the light barrier (417), and arranged to transmit light having the first or second polarization direction and to block light having the other of the first and second polarization directions,
  wherein the view forming elements (417a) are switched between transmitting and shielding states by changing the polarization direction of light produced by the backlight (407).

19. A multi-view autostereoscopic display device according to claim 18, wherein the backlight (407) of the view forming means comprises a plurality of light sources, each arranged to produce light polarized in the first or second direction, wherein the light sources arranged to produce light polarized in the first and second directions are arranged to be activated selectably.

20. A multi-view autostereoscopic display device according to claim 18, wherein the light polarizing layer of the view forming means forms a functional part of the image forming means.

21. A multi-view autostereoscopic display device according to claim 18, wherein a number of the slits of the light barrier of the view forming means are provided with half wave retarders for changing the polarization direction of light transmitted therethrough.

22. A multi-view autostereoscopic display device according to claim 1, wherein the driving means (119) is arranged to switch the view forming elements (111) such that, in each of the first and second portions of the driving cycle, the view forming elements (111) having the transmitting state and the shielding state are distributed alternately in the row direction and the column direction of the display pixels (105).

23. A method of driving a multi-view autostereoscopic display device, the device comprising an image forming means (103) having an array of display pixels (105) arranged in rows and columns for producing a display, and a view forming means (109, 117) positioned in registration with the image forming means (103) and having an array of view forming elements (111) each being configurable to focus the output of groups of the display pixels (105) into a plurality of views projected in different horizontal directions, the method comprising
in a first portion of a driving cycle, driving a first group of display pixels (105) with display data for a first plurality of views and switching first and second view forming elements (111b, 111c) that are horizontally adjacent to each other to transmitting and shielding states respectively, so that the first plurality of views can be observed through the first view forming element (111b); and
in a second portion of the driving cycle, driving the first group of display pixels (105) with display data for a second plurality of views and switching the first and second view forming elements (111b, 111c) to shielding and transmitting states respectively, so that the second plurality of views can be observed through the second view forming element (111c).

24. A method according to claim 23, wherein the switching between the transmitting and shielding states of the view forming elements (111) comprises applying an electric field across a liquid crystal material.

25. A method according to claim 23, wherein the second portion of the driving cycle is immediately followed by a first portion of a subsequent driving cycle, so that the output of each group of pixels is observable through the two view forming elements (111b, 111c) alternately.

26. A method according to claim 25, wherein the image forming means (103) is driven at a frame rate of at least 100 Hz.

27. A method according to claim 23, further comprising providing a two dimensional mode of operation in which:
the view forming elements (111) is switched to be transmissive and to not perform the view forming function; and
a driving means (119) drives the image forming means (103) with display data for a single view.

28. A display driver (119) for a multi-view autostereoscopic display device (101), the display device (101) comprising an image forming means (103) having an array of display pixels (105) arranged in rows and columns for producing a display, and a view forming means (109, 117) positioned in registration with the image forming means (103) and having an array of view forming elements (111) each being configurable to focus the output of groups of the display pixels (105) into a plurality of views projected in different horizontal directions, wherein the display driver (119) is for driving the image forming means (103) with display data and for switching the view forming elements (111) of the view forming means (109, 117), and wherein the display driver (119) is arranged to:
in a first portion of a driving cycle, drive a first group of display pixels (105) with display data for a first plurality of views and switch first and second view forming elements (111b, 111c) that are horizontally adjacent to each other to transmitting and shielding states respectively, so that the first plurality of views can be observed through the first view forming element (111b); and
in a second portion of the driving cycle, drive the first group of display pixels (105) with display data for a second plurality of views and switch the first and second view forming elements (111b, 111c) to shielding and transmitting states respectively, so that the second plurality of views can be observed through the second view forming element (111c).

* * * * *